W. L. & N. L. BRADLEY & W. HUBBARD.

Pressure Bell.

No. 1,798. Reissued Oct. 25, 1864.

WITNESSES

W. B. Andrews

John P. Craighead

INVENTOR

W. L. Bradley Assignees

N. L. Bradley by their att

W. Hubbard C. P. Renwick

N. PETERS. Photo-Lithographer. Washington, D. C.

UNITED STATES PATENT OFFICE.

WILLIAM L. BRADLEY, NATHANIEL L. BRADLEY, AND WALTER HUBBARD, OF WEST MERIDEN, CONNECTICUT, ASSIGNEES, BY MESNE ASSIGNMENTS, OF JASON BARTON.

IMPROVEMENT IN PRESSURE-BELLS.

Specification forming part of Letters Patent No. 14,593, dated April 8, 1856; Reissue No. 1,798, dated October 25, 1864.

*To all whom it may concern:*

Be it known that JASON BARTON, late of Middle Haddam, in the county of Middlesex and State of Connecticut, did in his lifetime invent certain new and useful Improvements in Pressure-Bells; and I do hereby declare that the following is a full, clear, and exact description of his said invention, reference being had to the accompanying drawings, in which—

Figure 1:
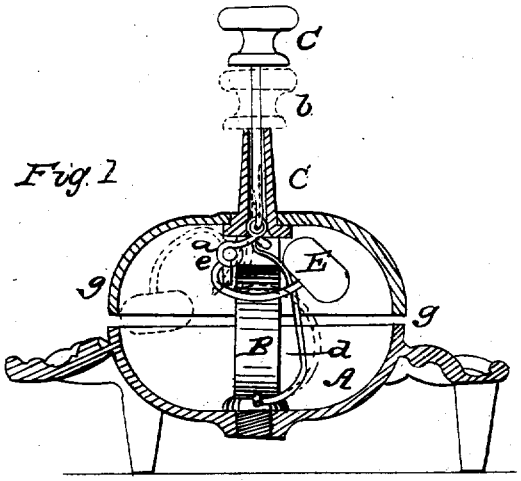
Figure 2:
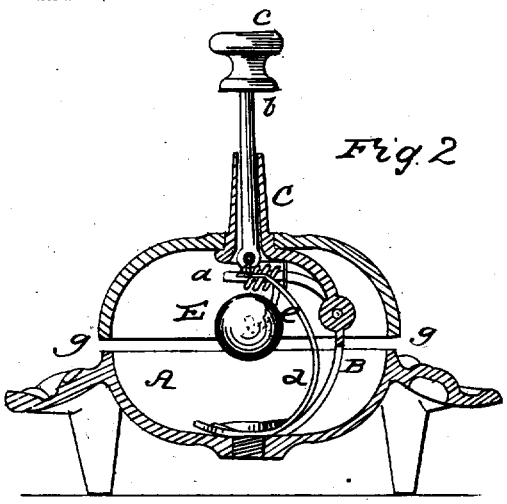

Figure 1 represents a vertical section through the center of a call-bell constructed according to said Barton's invention, and Fig. 2 represents a similar section at right angles to that represented by Fig. 1.

Pressure-bells as constructed prior to the invention of JASON BARTON, so far as the knowledge of his assignees extends, had a bell similar in form to a clock-bell, which was struck by striking mechanism, the hammer of which was arranged to swing in a plane parallel or thereabouts with the plane of the rim of the bell. This striking mechanism was operated by a piston extending through the axis of the bell, and the connection between the piston and the striking mechanism was by means of a species of escapement, which changed the direction in which the pressure operated at right angles, and which permitted the detachment of the hammer and its spring from the piston when the latter was moved into a certain position. Sometimes two bells were combined with a single piston and duplex striking mechanism upon the same plan, the bells being arranged mouth to mouth a short distance apart. Such pressure-bells were objectionable because of the indirect connection of the hammer or striking-instrument with the piston and the consequent cost of the striking mechanism.

The object of the invention of the said JASON BARTON was to obviate these objections; and it consists of a new combination and arrangement of the striking mechanism and piston of the bell, whereby the construction of the parts of the pressure-bell is much simplified.

The said combination and arrangement consist of the combination of a striking-instrument arranged to swing in a plane at right angles or thereabouts to the plane of the rim of the bell, with a piston extending through the axis of the bell, so that the plane in which the striking-instrument or hammer swings passes through the axis of the piston or thereabouts, (instead of being substantially at right angles thereto, as in the old pressure-bells,) whereby the connection between the piston and the striking-instrument may be made directly and without the use of an escapement or other mechanism to change the direction in which the pressure operates at right angles.

The invention of the said BARTON consists, further, of the combination of the said striking-instrument, piston, and bell with a stand for the same constructed so as to permit the striking-instrument to swing freely in the manner described.

The said invention also consists of the combination of the bell-striking instrument, piston, and stand in such manner that the movement of the hammer by the piston is limited, and consequently that the hammer cannot be held in contact with the bell by pressure upon the piston, although the piston acts directly upon the hammer tongue or shank.

The said invention is embodied in the pressure-bell represented in the accompanying drawings.

A is a base supporting a stand, B C, to which is secured the bell D. The lower part, B, of the stand is curved, as shown in Fig. 2, to allow the tongue and hammer to swing from one side of the bell across the center and into the upper part thereof. The upper part, C, of the stand consists of an upright tube, which passes through and screws firmly into the center of the bell. Near the top of the interior of the bell, but at a little distance from the center thereof, there is secured to the stand a fixed horizontal pivot, *a*, the position of which is best shown in Fig. 1. Upon this pivot the tongue of the bell swings. This tongue is in the form of a curved lever of the first order, with arms of unequal length, the hammer E being at the end of the longer arm and the shorter arm being connected to the pressure-piston *b*, which passes upward through the tube C and is furnished outside with a knob, *c*. A spring, *d*, is secured to the lower part of the stand B to act upon the upper part of the tongue in such a manner as to raise the hammer up nearly to the top of the bell when no pressure is applied to the knob, and at the same time to raise the piston *b* and knob. This spring is curved in such a manner (shown best in Fig. 2) as to allow the tongue to swing through it. The tongue and piston are so constructed that when the piston is pushed down gently the knob of the piston strikes the top of the tube C before the hammer touches the bell, and consequently the hammer will remain at rest nearly touching the bell close to the edge, as shown in red outline in Fig. 1; but in pushing down the piston sharply the elasticity of the tongue allows the hammer to strike the bell and instantaneously recoil.

In order that the hammer may strike the bell at right angles to its surface the tongue should be flattened or made thinner at a short distance from the hammer, as shown in Fig. 1, so that it will be more flexible at that point and allow the hammer toward the conclusion of its movement to swing outward instead of continuing to swing upward, as it would otherwise do in some degree during the latter part of its movement.

The spring *d* is not indispensable to the proper operation of this bell, as without the spring the hammer will swing back by gravitation when the pressure is removed from the knob *c*; but without the spring it will not swing back so far or so high, and consequently will not strike so hard a blow when the knob is depressed, unless the knob is previously pulled up by the hand, and on this account I prefer to apply the spring.

As the pivot *a* is horizontal, or, in other words, has its axis in a plane parallel with the plane of the mouth or rim *g g* of the bell D, the hammer E swings in a plane that is at right angles or thereabouts with the plane of the rim of the bell. The position of the pivot *a* near the top of the interior, but out of the center of the bell, is advantageous, because it allows the longest swinging motion that the tongue and hammer could make within the bell to strike the bell at or nearly at right angles to its surface.

A handle may be attached to the top of the tube C so that the bell may be rung while held in the hand.

What is claimed as the invention of said JASON BARTON in pressure-bells, to be secured by Letters Patents, is—

1. The combination and arrangement of the bell-striking instrument arranged to swing in a plane substantially at right angles with the plane of the rim of the bell, and piston extending through the axis of the bell, these three operating substantially as set forth.

2. The combination of the bell-striking instrument, piston, and curved stand, whereby the striking-instrument is permitted to swing across the bell in a plane substantially at right angles with the plane of the rim of the bell, substantially as set forth.

3. The combination of the bell-striking instrument, piston, and stand, substantially as described, so that the piston strikes another part of the apparatus before the hammer strikes the bell in a plane substantially at right angles with the plane of the rim of the bell, substantially as set forth.

In witness whereof we, the assignees of the said BARTON, have hereto set our hands.

WM. L. BRADLEY.
NATHANIEL L. BRADLEY.
WALTER HUBBARD.

Witnesses:
GEORGE A. FRY,
LUTHER GRIGG.